April 15, 1924.
B. W. JONES
MOTOR CONTROL
Filed March 29, 1922
1,490,776
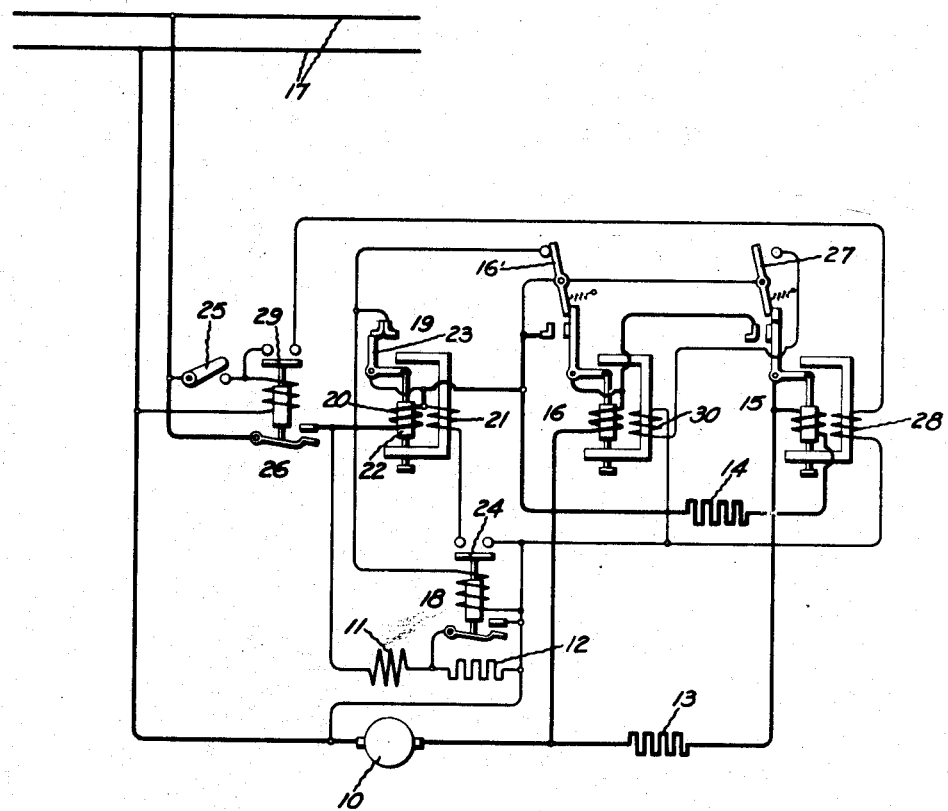
Inventor:
Benjamin W. Jones,
by Albert G. Davis
His Attorney Patented Apr. 15, 1924.

1,490,776

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

MOTOR CONTROL.

Application filed March 29, 1922. Serial No. 547,794.

*To all whom it may concern:*

Be it known that I, BENJAMIN W. JONES, a citizen of the United States, residing at Schenectady, in the county of Schenectady, State of New York, have invented certain new and useful Improvements in Motor Control, of which the following is a specification.

My invention relates to the control of electric motors, and it provides improved means whereby the motors may be started and stopped and generally controlled in a safe, reliable and efficient manner.

One of the objects of the invention is to automatically control an electric motor in accordance with the work to be performed by the motor.

Although the invention is not necessarily limited thereto, the control of an electric motor driving a tube-drawing machine presents difficulties for which the invention provides a good solution. The material to be formed into a metallic tube is projected through a tube-forming die for a short distance so that the end of the tube may be grasped by tongs operated by an electric motor and the tube drawn through the die by the motor at comparatively high speed. If the motor is operated at high speed continuously, when the tongs first engage the end of the tube, the speed may be such as to pull the tongs loose from the tube, or give a jerk to the tube which will produce objectionable results, or produce other undesirable effects as will be understood by those skilled in the art. It is desirable that the motor operate at a comparatively slow speed until the tongs safely and securely grab the end of the tube and that the speed of the motor be gradually increased up to the full operating speed in as short an interval of time as is practical, so that the tube may be drawn through the die at a comparatively high speed. Furthermore, it is desirable that the speed of the driving motor at the start of operation shall be such that the metal may begin to "flow." The speed of operation may be considerably increased when the "flow" of the metal of the tube has set in. It is also desirable that the speed of the motor be decreased to the "basic" or slow speed after the tube has been drawn through the die.

In accordance with the present invention, the speed of the motor is automatically controlled in a simple, reliable and effective manner, so that the speed of the motor is in accordance with the momentary requirements.

For a better understanding of the invention, reference is had to the accompanying drawing which shows in simplified diagram a system of motor control embodying the invention for the purpose of explaining the principles thereof.

The electric motor 10 is provided with a shunt field 11, and a resistor 12 is provided for controlling the degree of excitation of the shunt field and thereby the speed of the motor. In order to explain the principles of the invention, it will be assumed that the motor 10 is used to operate or drive a tube-drawing machine, and it will be understood that the rotating element of this motor may be mechanically connected to drive the tube-drawing machine in any suitable manner. The resistors 13 and 14 are provided for limiting the current taken by the motor at starting and during the "pump back" caused by suddenly increasing the field excitation of the motor when the motor is operating at high speed. The electromagnetic switch 15 of the series lockout type is provided for short circuiting the resistor 13, and the electromagnetic switch 16 of the series lockout type is provided for short circuiting the resistor 14 and thereby connecting the motor armature directly across the source of supply 17. These electromagnetic switches 15 and 16 are preferably of the type having each a series winding energized responsively to the motor armature current and a shunt winding energized to cooperate with the series winding to control a movable switch member. These switches are preferably of the type described and broadly claimed in the Patent No. 1,445,994, dated February 20, 1923, issued to Eugene R. Carichoff and myself, although the invention is not necessarily limited to the use of this particular type of switch for controlling the accelerating resistors 13 and 14. This application is assigned to the same assignee as the said Carichoff and Jones patent.

The resistor 12 in the shunt field circuit of the driving motor is controlled by a normally open electromagnetic switch 18, and this switch 18 is controlled by the normally closed electromagnetic relay 19 and the auxiliary switch 16' of the accelerating contactor 16. This relay 19 is preferably of the type described and broadly claimed in the said Carichoff and Jones patent. The relay comprises a series winding 20 which is connected in the motor armature circuit and therefore energized responsively to the current taken by the motor, and the shunt winding 21 of this relay is controlled responsively to the operation of the electromagnetic switch 18; that is, the winding 21 is energized when the switch 18 is closed and deenergized when the switch 18 is opened.

The relay is provided with a magnetic movable member 22 which is under the control of the windings 20 and 21, and a switch member 23 is connected to and operated by the plunger 22. This switch member 23 is biased to the closed position as shown so as to energize the winding of the electromagnetic switch 18. The arrangement is such that switch member 23 is operated to the open position so as to cause the electromagnetic switch 18 to open and insert the resistor 12 in the motor armature field circuit when the current taken by the motor has increased to a predetermined value. When the switch 18 opens, the shunt winding 21 of the relay 19 is opened at the auxiliary switch 24, so that the return of the switch member 23 to its biased position is under the control of the series winding 20. The relay will thereby be operated to close and energize the switch 18 to short circuit the resistor 12 when the current taken by the motor subsequently drops to a predetermined value, which may be different from the value of the motor armature current at which the switch member 23 is operated to the open position.

As thus constructed and arranged, the operation of my invention is briefly as follows: The pilot or master switch 25 will first be closed, thereby energizing the electromagnetic line contactor 26 to close and connect the motor armature to the source of supply through a circuit which includes the starting or accelerating resistors 13 and 14. This circuit may be traced as follows: from the line contactor 26, through the series winding of the relay 19, the resistor 14, the series winding of the contactor 15, resistor 13, through the motor armature to the other supply conductor. The auxiliary switch 16' associated with the accelerating contactor 16 is normally biased so as to make engagement with its stationary contact, so that the winding of the electromagnetic switch 18 is energized through a circuit which includes the series winding 20 of the relay 19, resistor 14, series winding of contactor 15, resistor 13, series winding of contactor 16, main switch member of contactor 16, the auxiliary switch 16' to the other supply conductor. It will be noted that when the auxiliary switch 16' is in its biased position, the electromagnetic switch 18 is energized to close, regardless of the operation of the relay 19 so that the motor will start on full field. The shunt winding 28 of the accelerating contactor 15 is energized through the auxiliary switch 29 of the line contactor 26 when this line contactor closes. When the current taken by the motor drops to a predetermined value, the accelerating contactor 15 will operate to short circuit the starting resistor 13 and automatically include the series winding of the contactor 16 in the motor armature circuit. The contactor 15 in closing operates the auxiliary switch 27 against its bias so as to make engagement with its stationary contact and thereby energize the shunt winding 30 for the contactor 16. When the motor current again drops to a predetermined value, this contactor 16 will be energized to close and short circuit the resistor 14, thereby connecting the motor armature directly across the source of supply. The auxiliary switch 16' is opened by the closing of the accelerating contactor 16, but the field contactor 18 will be maintained closed through the contacts of the relay 19. The accelerating contactors 15 and 16 will be maintained in their closed positions by their respective shunt coils 28 and 30, and their series coils.

Assume that the equipment has been thus started and that the motor is used to operate a tube-drawing machine. By reason of the fact that the resistor 12 in the shunt field winding of the motor is short circuited, the motor is operating at its "basic" or slowest speed. When the tube to be drawn is inserted through the die by the operator so that the tongs of the tube-drawing machine may engage the end of the tube to draw the tube through the die, the current taken by the motor will increase to such a value when the tube is grasped by the tongs that the cooperating shunt and series windings of the relay 19 will cause the switch member 23 of the relay to be operated to the open position, thereby deenergizing the electromagnetic switch 18. (It will be remembered that the auxiliary switch 16' of the starting contactor 16 opened its circuit for the energization of the winding of the contactor 18 when the contactor 16 closed and that the winding circuit of this contactor was maintained through the contacts of the relay 19). The electromagnetic switch 18 thereby opens and inserts the resistor 12 in the circuit of the shunt field 11. This will cause the speed of the driving motor to gradually increase and thereby cause the tube to be drawn through the die at a comparatively high speed. The opening of the electromagnetic switch 18 deenergizes the shunt windings 21 of the relay 19 at the auxiliary switch 24 so that the return of the switch member 23 of the relay to its biased position at which the electromagnetic switch 18 in energized, is under the sole control of the series winding 20 of the relay. When the tube has been drawn through the die, it is desirable that the speed of the motor shall return to the basic slow speed in order to be ready for the next operation of tube drawing. When the tube is drawn through the die, the current taken by the electric motor will be decreased, but this current will be ordinarily a higher value than the current taken by the motor when running light at the basic speed. When the current taken by the motor drops to a predetermined value, the switch member 23 will be magnetically operated to its closed position, thereby energizing the electromagnetic switch 18 to short circuit the resistor 12. The excitation of the shunt field is thereby increased and the speed of the motor is reduced to the basic speed. When the excitation of the shunt field is thus increased, a momentary "pump back" effect is caused; in other words, the motor will operate as a generator momentarily until the speed of the motor has been reduced somewhat. The provision of the shunt winding 21 which cooperates with the series winding 20 of the relay 19 prevents the switch member 23 of the relay from opening during this pump back effect. That is because of the fact that the holding-closed effect of the shunt winding 21 will predominate over the effect of the series winding 20, to magnetically hold the switch member 23 in the closed position for all the values of reverse current which would occur in ordinary operation. The same is true of the series contactors 15 and 16 and these contactors will also remain closed during the "pump back."

It will be observed that the series contactor type electromagnetic relay 19 controls the speed of the driving motor 10 in accordance with the momentary conditions imposed on the motor. The speed of the motor is very nicely and automatically controlled in accordance with the work to be done, so that the operator of the tube-drawing machine need pay no attention to the control of the electric motor and may direct his attention entirely to his other duties in attending the tube-drawing machine. It will also be observed that the excitation of the shunt field of the motor is reduced in response to the operation of the relay 19 with the shunt and series coils of the relay cooperating, and that the excitation of the shunt field is increased by the operation of the relay 19 with the switch member 22 thereof under the sole control of the series winding 19. That permits of calibrating the relay so that the value of motor armature current at which the speed of the motor is to be increased may be adjusted independently of the value of the motor armature current at which the speed of the motor is to be decreased. The control of the shunt winding 21 of the relay by the auxiliary switch 24 of the field contactor 18 is positive; that is, when the field contactor is open, the shunt winding is deenergized and when the field contactor is closed, the shunt winding is energized. That insures a positive operation of the relay and insures that the operation of the relay will be directly and positively governed by the degree of excitation of the motor field.

It will be understood by those skilled in the art that while I have described my invention in connection with its operation of a tube-drawing machine because of the fact that the invention has a particular application thereto, the invention is not necessarily limited in its use to this particular application.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A system of motor control comprising a variable speed electric motor having a field, means for controlling the said field, an electromagnetic switch having cooperating shunt and series windings, the said switch having a switch member biased to one position for controlling the said means, and connections whereby the said switch member is operated to a second position under the control of both windings to decrease the excitation of the said field and is returned to the biased position under the control of the series winding to increase the excitation of the said field.

2. A system of motor control comprising an electric motor having a field, an electromagnetic switch for controlling the said field, the said switch having a winding energized in response to the motor armature current, a shunt winding and a switch member biased to one position under the control of said windings, and connections whereby the said switch member is operated against its bias under the control of both of said windings to reduce the excitation of the said field when the current taken by the said motor rises to a predetermined value and is subsequently operated to its biased position under the control of the series winding to increase the excitation of the said field when the current taken by the motor drops to a predetermined value.

3. A system of motor control comprising an electric motor having a shunt field, an electromagnetic switch of the series lockout type for controlling the said field, the said switch having a switch member biased to one position, a series winding energized responsively to the motor armature current and shunt winding energized responsively to the operation of the said switch member, and connections whereby the said switch member is operated under the control of both of said windings to reduce the excitation of the said field to increase the motor speed, the switch member is operated under the control of the said series winding to increase the excitation of the said field to reduce the motor speed, and both of said windings prevent the operation of the switch member during the generator action of the motor when the excitation of the said field is thus increased.

4. A system of motor control comprising a variable speed electric motor having a shunt field, a resistor for controlling the said field, an electromagnetic switch of the series lockout type having a series winding in the motor armature circuit and a shunt winding, the said switch having a switch member biased to the closed position to effect the short circuiting of the said resistor, and connections whereby the said switch member is operated to the open position under the control of both windings to effect the opening of the short circuit around the said resistor when the current taken by the motor rises to a predetermined value and is operated to the closed position under the control of the series winding when the current taken by the motor subsequently drops to a predetermined value.

5. A system of motor control comprising a variable speed electric motor having a shunt field, a series lockout type electromagnetic switch for controlling the said field, the said switch having a series winding in the motor armature circuit, a shunt winding and a switch member biased to one position under the control of the said windings, means for controlling the said shunt winding responsive to the degree of excitation of the said field, and connections whereby the said switch member is operated to reduce the excitation of the said field under the control of both of said windings when the motor current rises to a predetermined value and is subsequently operated to increase the excitation of the said field under the control of the said series winding when the motor current drops to a predetermined value.

6. A system of motor control comprising a variable speed electric motor having a shunt field, a resistor for controlling the said field, an electromagnetic switch for controlling the said resistor, a relay having a switch member biased to one position for controlling the said switch, the said relay having a series winding energized in accordance with the motor current and a shunt winding, and connections whereby the shunt winding is energized to cooperate with the said series winding to control the said switch member when the said electromagnetic switch is closed, and is deenergized so that the said switch member is under the control of the said series winding when the said electromagnetic switch is open.

7. A system of motor control comprising a variable speed electric motor having a shunt field, a resistor for controlling the said field, a normally open electromagnetic switch for short circuiting the said resistor, an electromagnetic relay of the series lockout type having a switch member biased to the closed position to energize the said switch to close, the said relay having a series winding in the motor armature circuit and a shunt winding, means controlled by the said switch for energizing and deenergizing the said shunt winding in response to the closing and opening of the said switch, and connections whereby the said relay switch member is operated to deenergize the said switch under the control of both relay windings when the current taken by the motor rises to a predetermined value, the switch member is operated to the closed position to energize the said switch under the control of the relay series winding when the current taken by the motor subsequently drops to a predetermined value, and the opening of the relay switch member during the generator action of the motor when the excitation of the said field is thus increased by the closing of the said switch is prevented.

In witness whereof, I have hereunto set my hand this 28th day of March 1922.

BENJAMIN W. JONES.